No. 620,546. Patented Feb. 28, 1899.
G. G. GUENTHER.
CIRCULAR TREE CULTIVATOR.
(Application filed Nov. 16, 1898.)
(No Model.)
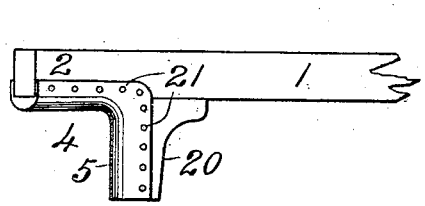
Fig. III.
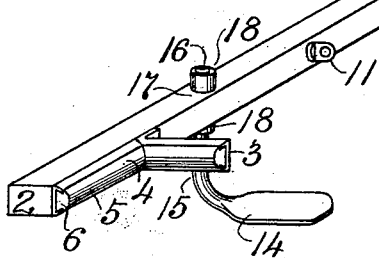
Fig. I.
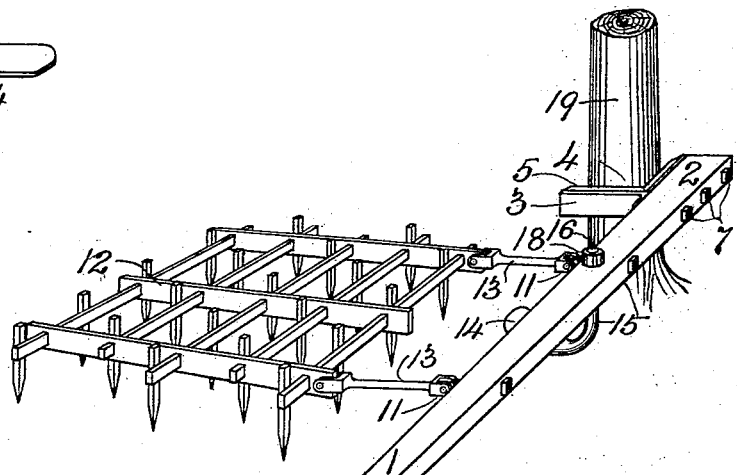
Fig. II.
Witnesses.
J. K. Hoffman
A. M. Stamps.
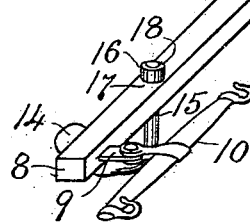
Inventor.
Geo. G. Guenther
BY
ATTORNEY.

UNITED STATES PATENT OFFICE.

GEORGE G. GUENTHER, OF ORANGE, CALIFORNIA.

CIRCULAR TREE-CULTIVATOR.

SPECIFICATION forming part of Letters Patent No. 620,546, dated February 28, 1899.

Application filed November 16, 1898. Serial No. 696,637. (No model.)

*To all whom it may concern:*

Be it known that I, GEORGE G. GUENTHER, a citizen of the United States, residing at Orange, in the county of Orange, State of California, have invented a new and useful Improvement in an Agricultural Implement—namely, a Circular Tree-Cultivator—of which the following is a specification.

My invention relates to a circular tree-cultivator; and the object of my improvement is to provide an agricultural implement for the purpose of cultivating the soil around and about trees with or without low branches close to the trunk or stem without injuring the bark of the tree by contact with the implement or any of its connections and preventing the animal propelling the cultivator or other implements from striking the tree or pulling at its branches or injuring the fruit, keeping it at such a distance from the tree as not in any wise to interfere with the tree. The low cultivation of a tree being urged as advisable, I propose to cultivate the soil under a low culture tree without breaking the limbs or disturbing the fruit thereon or barking the tree. I design to effect this by means of circular cultivation, using the trunk or stem of the tree as a fulcrum. I attain these objects by the mechanism in the accompanying drawings, in which—

Figure I is a perspective view of the cultivator beam and runners with the cultivating implement removed. Fig. II is a perspective view of the circular cultivator in operation; and Fig. III is the inner end of the cultivator-beam, showing alternative form of construction.

Similar numerals refer to similar parts in the several views.

1 is the cultivator-beam, preferably made of wood; 2, inner end of beam; 3, arm or brace made of metal; 4, angle formed by arm 3 and beam; 5, rubber or other elastic cushion; 6, dovetail recess to secure cushion; 7, bolts securing metal arm; 8, outer end of beam; 9, attachment for singletree; 10, singletree; 11, attachment, a chain or rod for harrow or implement; 12, harrow; 13, connection for implement; 14, shoes to support beam; 15, stem of shoe; 16, pivot end of stem; 17, hole for pivot to work in; 18, collars to adjust shoe; 19, stem of tree; 20, arm or brace made of wood; 21, nails or screws securing cushion.

The arm or brace 3 may be placed at right angles to the beam or at any desirable angle and of any desirable length or may be made with the end of the beam 2 to clutch the tree; but for all practicable purposes it is only necessary to make arm 3 and the end of the beam 2 at right angles to each other and about eight inches in length, respectively.

The operation of the circular tree-cultivator is as follows: The cultivator-beam 1, supported upon the ground in the shoes 14, is placed at the angle 4 against the stem or trunk of the tree 19. The harrow, plow, or other cultivator is attached to the beam by the attachment 11 at any desirable point from the tree and the animal or animals hitched to the singletree 10. The movement of the animal drawing the beam and the cultivator in a circular motion around the tree causes the beam at the angle 4 to press tightly against and grasp the tree, providing a leverage, whereby the movements of the beam around the tree draws the cultivator or other implement around the tree. The cultivator may be removed from tree to tree in an orchard by simply pulling it lengthwise of the beam, the shoes 14 having a rotary motion on a pivot 16, provided in the holes for the pivot to work in 17 in order to adjust the shoe or arm 3 or 20. The inner end of beam 2 may be all metal or wood and padded with rubber or other elastic cushion fastened to the wood 21 or placed in a dovetail recess 6, and thereby prevent the beam and arm while in motion from barking the tree. The beam is of sufficient length to allow the animal pulling the beam to move in the rows between the trees of the orchard.

The circular cultivation above described has for its object and use to provide a safe and practical method of cultivating, of making ditches for irrigation, or of otherwise caring for the soil about the tree and preventing injury to the tree, its branches, or its fruit. Any form of cultivator, plow, or harrow may be attached to the beam.

I claim as my invention and desire to secure by Letters Patent—

The combination in a circular tree-cultivator of the beam 1; the inner end of the beam 2 and the arm or brace 3 attached, made of metal attached to the beam by bolts or screws 7; the angle formed by the beam and arm 4; the cushion of rubber or other elastic material 5; the dovetail recess 6 to secure the cushion; the attachment for the singletree 9 and singletree 10; the attachment for the harrow or other agricultural implement 11 at any point on beam desired; the harrow or other cultivator or other implement 12; the connection for implement 13; the shoes to support beam 14; the stem of shoes 15; the pivot end of stem of shoes 16; the hole for pivot end of stem of shoe to work in 17; the collars to adjust shoe 18; with the stem or trunk of the tree all substantially as described.

In witness that I claim the foregoing I have hereunto subscribed my name, this 7th day of November, 1898, at Orange, California.

GEORGE G. GUENTHER.

Witnesses:
HERMAN HERN,
J. N. BILL.